R. W. BURNETT.
DRAFT RIGGING FOR RAILWAY CARS.
APPLICATION FILED AUG. 10, 1914.
1,127,958.        Patented Feb. 9, 1915.
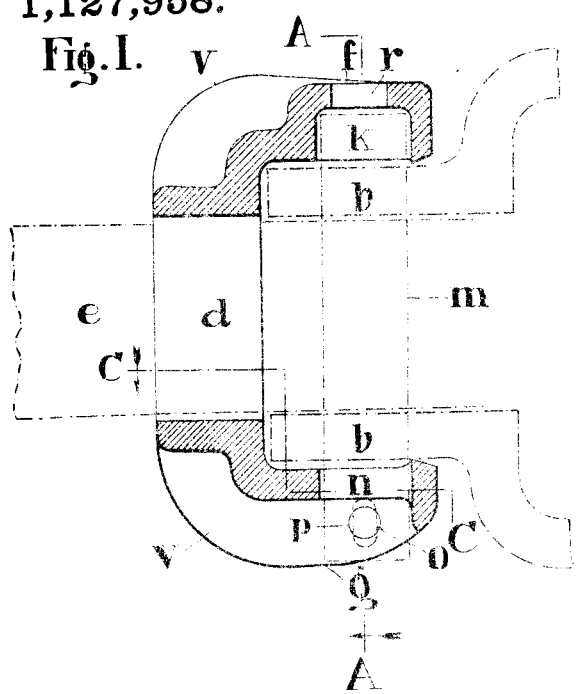
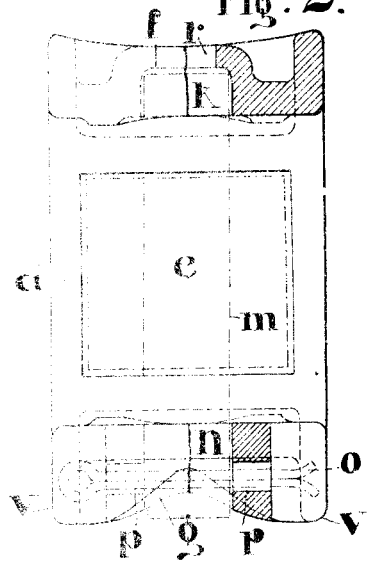
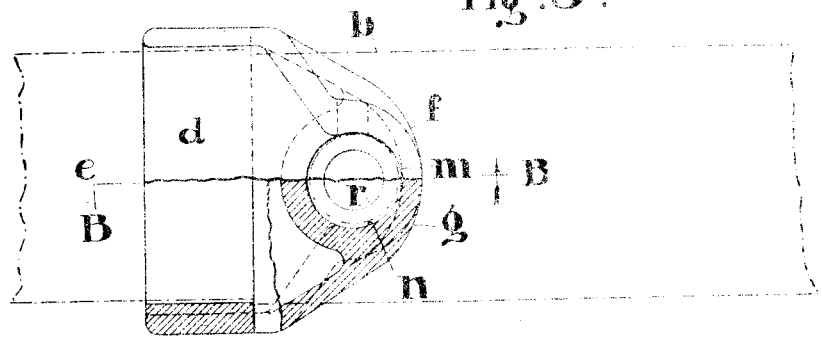
Witnesses:
Richard W. Burnett
Inventor
per Attorney

UNITED STATES PATENT OFFICE.

RICHARD WEBB BURNETT, OF MONTREAL, QUEBEC, CANADA.

DRAFT-RIGGING FOR RAILWAY-CARS.

1,127,958.      Specification of Letters Patent.      Patented Feb. 9, 1915.

Application filed August 10, 1914. Serial No. 856,105.

*To all whom it may concern:*

Be it known that I, RICHARD WEBB BURNETT, a citizen of the United States of America, residing at the city of Montreal, Province of Quebec, Dominion of Canada, have invented certain new and useful Improvements in Draft-Rigging for Railway-Cars; and I do hereby declare that the following is a full, clear, and exact description of the same.

My invention relates particularly to the connection between the spring pocket or yoke and the shank of the draw-bar, and it has for its object to render this connection more durable and reduce to a minimum the danger of failure of this connection due to breakage or distortion of the spring pocket and breakage or loss of the connecting pin.

Careful investigation has shown that failure of the connection is due to the spreading of the yoke or pocket thus throwing a bending strain on the pin causing it to break. These accidents are prevented by my invention which consists of a rigid collar adapted to encircle the shank of the draw-bar and having a pair of integral lugs adapted to straddle the ends of the spring pocket, such lugs being constructed to accommodate the ends of the connecting pin one end of which is locked in one of the lugs.

For full comprehension, however, of my invention reference must be had to the accompanying drawings forming a part of this specification in which similar reference characters indicate the same parts, and wherein:

Figure 1 is a side elevation partly in section of my improved connection with portions of the yoke or spring pocket and draw-bar shank shown in dotted lines; the section being taken on line B B Fig. 3; Fig. 2 is an elevation taken on line A A Fig. 1; and Fig. 3 is a part plan view and part horizontal sectional view, the sectional view being taken on line C C of Fig. 1.

The ends of the spring pocket or yoke are indicated at *b b* and the shank of the draw-bar at *e*.

According to the present embodiment of my invention the collar indicated at *d* consists of a casting of rectangular form to fit upor the shank of the draw-bar. The lugs are indicated at *f* and *g* and they are preferably located at the top and bottom respectively. The top lug has a chamber or socket *k* to receive the upper end of the connecting pin *m* and the bottom lug has an opening *n* through which the pin is inserted, this lug also having a pair of holes *p p* registering with a transverse hole in the pin for a split cotter pin *o*. In order to protect the cotter pin the bottom lug is in the form of a lip of sufficiently less width than the collar to accommodate the ends of the pin, the side portions of such lip being of greater depth than the middle portion to contain the holes *p* without unduly weakening the same. This feature is clearly shown in Fig. 2. The top lug has a boss containing the chamber or socket *k* the top of the boss having a hole *r* to permit the pin to be driven out when necessary. Collar *d* and lugs are braced by flanges *v* located at the side edges of the top and bottom thereof and extending around the lugs to form in one case the lip *g*, and in the other case the front wall of the boss *f*.

With my improved connection a headless connecting pin may be used thus permitting it to be inserted from below and locked in place by the cotter pin *o* thereby obviating the necessity of cutting an opening in the floor of the car to remove the pin as has been the practice heretofore. It also obviates the necessity of delay in the event of a broken pin as the damaged pin may be removed by simply withdrawing the cotter pin and a new one inserted without disturbing the draft rigging.

What I claim is as follows:—

1. In draft rigging for railway cars, a collar for encircling a draw-bar shank and having a pair of integral lugs adapted to straddle the ends of the yoke or spring pocket, and a pin effecting connection between the draw-bar shank and the spring pocket or yoke.

2. In draft rigging for railway cars, a collar for encircling a draw-bar shank and having a pair of integral lugs adapted to straddle the ends of the yoke or spring pocket and a pin effecting connection between the draw-bar shank and the spring pocket or yoke, the said lugs being constructed and arranged to receive the ends of the connecting pin.

3. In draft rigging for railway cars, a collar for encircling a draw-bar shank and having a pair of integral top and bottom lugs adapted to straddle the ends of the yoke or spring pocket, and a pin effecting connection between the draw-bar shank and the spring pocket or yoke, the top lug having a chamber or socket for the top of the pin and the bottom lug having an opening through which the pin may be inserted.

4. In draft rigging for railway cars, a collar for encircling a draw-bar shank and having a pair of integral top and bottom lugs adapted to straddle the ends of the yoke or spring pocket, and a pin effecting connection between the draw-bar shank and the spring pocket or yoke, the top lug being in the form of a boss having a chamber or socket for the upper end of the pin and the bottom lug being in the form of a lip of less width than the collar and increased in depth at its sides, such lip having an opening through which the connecting pin may be inserted and a pair of transverse holes, the pin having a transverse hole registering with the hole in the lip, and a split cotter pin passed through the registering holes, the said lugs being formed in part by flanges extending at each side edge of the top and bottom of the collar and extending around the edge and forming component part of the boss of the top lug and the lip of the bottom lug.

In testimony whereof I have signed my name to this specification in the presence of two witnesses.

RICHARD WEBB BURNETT.

Witnesses:
E. R. PITTS,
WILLIAM J. C. HEWETSON.